(12) United States Patent
Liu

(10) Patent No.: US 7,010,311 B2
(45) Date of Patent: Mar. 7, 2006

(54) WIRELESS NODE MULTIPLE HANDSET CORDLESS TELEPHONE SYSTEM

(76) Inventor: Frank Kung Fu Liu, 23130 Ridge Line, Diamond Bar, CA (US) 91765

( * ) Notice: Subject to any disclaimer, the term of this patent is extended or adjusted under 35 U.S.C. 154(b) by 145 days.

(21) Appl. No.: 10/446,244

(22) Filed: May 28, 2003

(65) Prior Publication Data

US 2004/0242244 A1    Dec. 2, 2004

(51) Int. Cl.
*H04B 3/36* (2006.01)
(52) U.S. Cl. .................. 455/462; 455/426.1; 455/74.1
(58) Field of Classification Search ................ 455/462, 455/426.1, 74.1
See application file for complete search history.

(56) References Cited

U.S. PATENT DOCUMENTS

| | | | |
|---|---|---|---|
| 3,955,140 A | 5/1976 | Stephens et al. | |
| 4,659,878 A | 4/1987 | Dinkins | |
| 4,989,230 A | 1/1991 | Gillig et al. | |
| 5,422,934 A | 6/1995 | Massa | |
| 5,586,168 A | 12/1996 | Bucalo et al. | |
| 5,737,703 A * | 4/1998 | Byrne | 455/442 |
| 6,240,297 B1 * | 5/2001 | Jadoul | 455/466 |
| 6,505,054 B1 * | 1/2003 | Douglas et al. | 455/552.1 |
| 6,766,175 B1 * | 7/2004 | Uchiyama | 455/462 |
| 2002/0086687 A1 * | 7/2002 | Kockmann et al. | 455/463 |

* cited by examiner

*Primary Examiner*—Joseph Feild
*Assistant Examiner*—S. Smith
(74) *Attorney, Agent, or Firm*—Dan Brown Law Office; Daniel R. Brown

(57) ABSTRACT

A wireless and cordless telephone node system. The system includes a node with a wireless transceiver that communicates wireless signals with a wireless network and a cordless transceiver that communicates cordless signals with multiple cordless terminal units. A switch routes call between the wireless network and the multiple cordless terminals. A variety of cordless terminals are provided that emulate conventional corded telephones, cordless telephones and wireless telephones. The wireless node is designed for both fixed and portable operation.

26 Claims, 12 Drawing Sheets

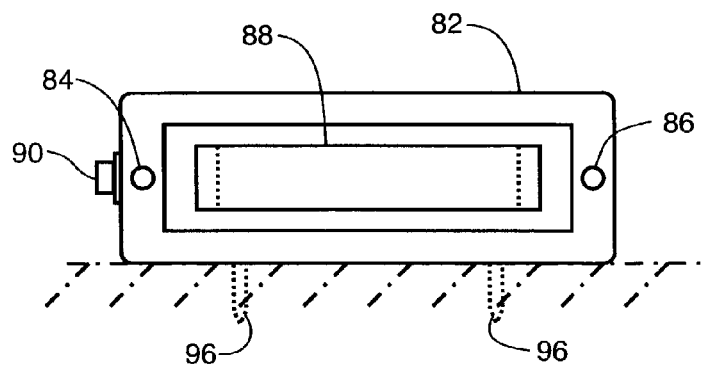
Fig. 10
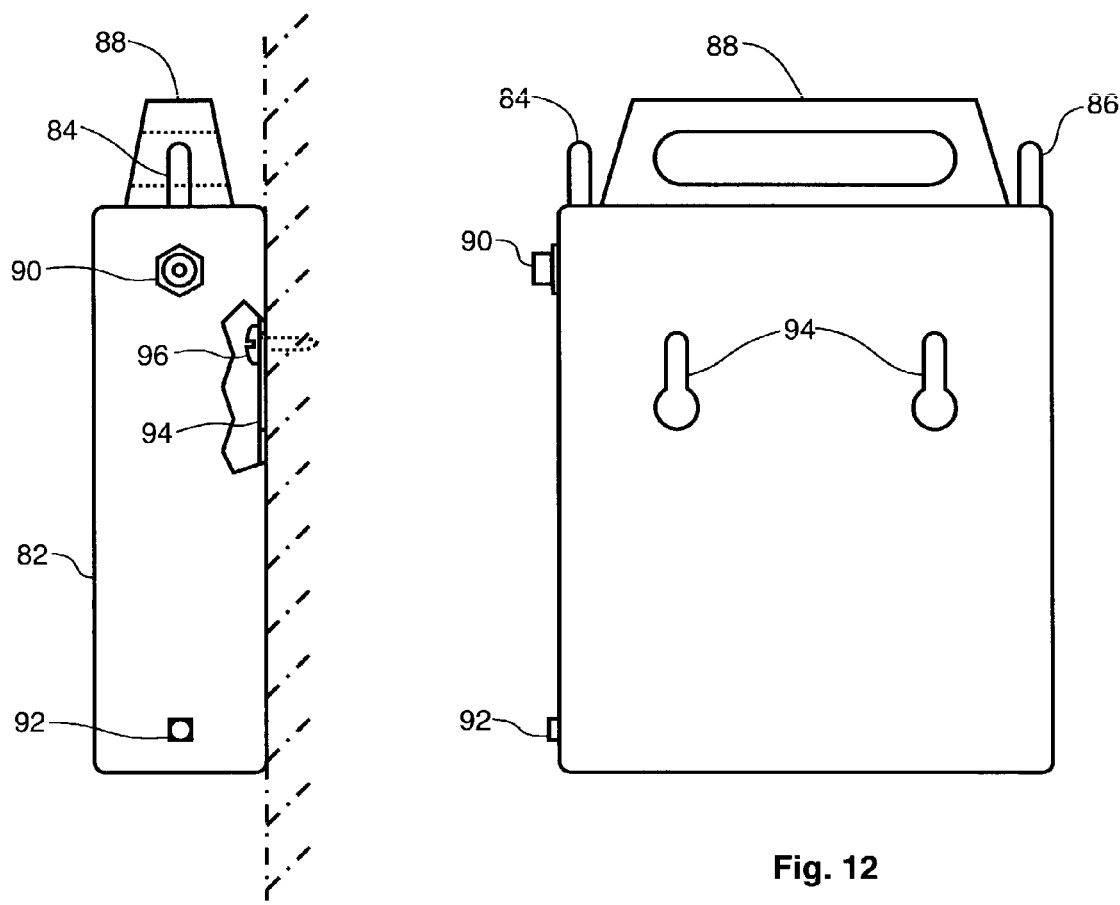
Fig. 11
Fig. 12

WIRELESS NODE MULTIPLE HANDSET CORDLESS TELEPHONE SYSTEM

BACKGROUND OF THE INVENTION

1. Field of the Invention

The present invention relates to telephones. More specifically, the present invention relates to multiple handset cordless telephones operable within a wireless telephone network.

2. Description of the Related Art

Users of modern telephony services have a wide range of products and services available to them. Among these is the conventional wire-line telephone that provides access to the Public Switched Telephone Network ("PSTN"). The classic telephone-set includes a base and a handset. The two are connected together by a cord that carries duplex audio, and sometimes signaling information. The base is further connected to the PSTN with a twisted pair of wires running from the user's telephone location to a telephone company central office. The handset rests on a hook switch on top of a cradle on the base. Over the years, many more convenient features have been added to telephones and telephone services. Cordless telephones were developed, which eliminated the cord between the base unit and the handset, but did not eliminate the twisted pair of wires connecting the base to the central office. In a cordless telephone, the cord is replaced by a pair or radio transceivers, one in the base and one in the handset, that allow the user to move freely within the radio coverage range of the transceivers. Wireless telephone networks have also been developed and deployed. Wireless networks eliminate the need for interconnection of the telephone terminal unit to the PSTN by a twisted pair of wires. Rather, a network of fixed radio transceivers replaces the wire-line network. Each wireless telephone handset contains a radio transceiver that communicates wirelessly with the wireless network. Wireless telephone networks greatly expand the roaming ability of the users as compared with cordless telephones because the network allows roaming of terminal units between several fixed radio transceivers.

The advent of cordless and wireless telephone service, as well as the dramatic increase in other telephony services, has changed the way people use telephones and their expectations about the convenience of service. Multiple extension systems exist that allow intercom functions as well as shared telephone resource functions. Cordless telephone headsets offer hands-free roaming. Most homes and office have multiple telephone extensions with different types of telephone instruments selected to meet users' desires. Many users have both a wire-line telephone and a wireless telephone. Many homes and offices enjoy the convenience and freedom of movement afforded by cordless telephone service. There is an expectation by users today that telephone service is ubiquitous and that people can be reached virtually anywhere and at anytime.

While there has been a great increase in the range of products and services available to users of telephony services, the increase has not been without some problems and costs. Many users now have wireless telephone number as well as a wire-line telephone numbers. This can lead to confusion and wasted time in attempts to reach a user when their whereabouts is not known. It is also more expensive to maintain two separate types of telephone service. Many of the convenient services offered by home or office telephone systems are not available with a wireless telephone. For example, multiple extensions, speakerphones, cordless telephone features, and system growth flexibility. Wireless and cordless services do create some user confusion as well. Some users prefer the classic desk type telephone, the so-called "2500 set", as opposed to the more technical user interface that wireless telephones employ. Others prefer advanced telephone instruments, such as cordless headsets or designer products. There are also issues as to battery charging and battery life. Tiny wireless telephones do not lend themselves to large capacity storage batteries that enable extended periods of battery-only operation. Thus, there is a need in the art for a system and method to integrate wireless telephony with conventional wire-line types of features and services while still maintaining the portability and ubiquitous nature of telephony service the users have come to expect.

SUMMARY OF THE INVENTION

A wireless telephone node system is taught. The system includes a node having a wireless transceiver that communicates wireless signals, and a first processor that converts wireless audio signals and wireless control signals from the wireless signals. The node also includes a first cordless transceiver that communicates cordless signals, and a second processor that converts two or more cordless audio signals and cordless control signals from the cordless telephone signals. A switch is coupled to connect between the wireless audio signals and the plural cordless audio signals. A controller is coupled to cause the switch to connect between any pair of the wireless audio signals and the two or more cordless audio signals in response to the wireless control signals or in response to the cordless control signals.

In a specific embodiment of the invention, the wireless transceiver operates in compliance with one of the promulgated wireless network signaling protocols. That protocol may be GSM, T-Mobile, CDMA, TDMA, or AMPS protocols. In specific embodiments the first cordless transceiver operates in the 900 MHz cordless band, the 1.8 GHz cordless band, the 2.4 GHz cordless band, or the 5.8 GHz band, and in accordance with an analog standard, the PHS, DECT, or DSS standard.

In another embodiment, the node includes a portable housing. A charging circuit with a charging output may be installed in the housing. In a refinement of this embodiment, the housing has a charging cradle formed thereon for engaging a cordless terminal unit. The charging output is aligned to couple to corresponding charging contacts on the cordless terminal unit when engaged with the charging cradle. Further, the charging circuit may include a battery that powers the node as well as providing power to the charging output. In a specific embodiment, a mounting structure is provided that is adapted to support the housing from a vertical surface.

In an improvement to the node design, a clock and clock display are added to the node. In another improvement, a broadcast radio receiver, such as an AM/FM receiver, having a radio audio output and a radio user interface is included in the node. In a particular embodiment, the radio audio output is coupled to the switch, and the controller operates to cause the switch to connect the radio audio to the wireless transceiver or the cordless transceiver.

The present invention also utilizes specialized cordless terminal units with the node. In one embodiment, the cordless terminal unit includes a second cordless transceiver that communicates cordless signals, including audio signals and control signals, with the first cordless transceiver. It also includes an audio circuit that couples audio signals between the second cordless transceiver and a speaker and microphone. A battery powers the cordless terminal unit. A telephone user interface receives various user inputs, and the user inputs are coupled to the second cordless transceiver as cordless control signals. An enclosure is provided that supports the battery, the second cordless transceiver, and the audio circuit.

In a particular embodiment of the cordless terminal unit, it includes an ear support structure fixed to the enclosure that supports the cordless terminal on a user's ear. It also includes a microphone support structure fixed to the enclosure for locating the microphone in receptive proximity to a user's mouth while the ear support structure is engaged with the user's ear.

In another embodiment of the cordless terminal unit, the enclosure further includes battery charging contacts disposed on the exterior thereof. The charging contacts are coupled to the battery for charging. The cordless terminal further includes a charging cradle adapted to receive the cordless terminal unit and a charging circuit disposed within the charging cradle. The charging terminals are disposed on the exterior of the charging cradle and are coupled to the charging circuit. The charging terminals are aligned to engage the battery charging contacts when the cordless terminal unit is engaged with the charging cradle.

In another specific embodiment of the cordless terminal unit, a handset that has the microphone and the speaker disposed therein is included. A cord couples from the microphone and the speaker to the audio circuit. In another specific embodiment, a handset having the microphone, the speaker, and the user interface disposed therein is provided. A cord couples from the microphone and the speaker to the audio circuit, and also couples from the user interface to the transceiver.

BRIEF DESCRIPTION OF THE DRAWINGS

FIG. 10 is a top view of a wireless node according to an illustrative embodiment of the present invention.

FIG. 11 is a side view of a wireless node according to an illustrative embodiment of the present invention.

FIG. 12 is a front view of a wireless node according to an illustrative embodiment of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a wireless node and system that couples wireless telephone resources to a multiple handset cordless telephone system. Portability of the system is enhanced through use of battery power, AC adapters and a modular design approach. Cordless handsets are provided that are consistent with prior art cordless designs, as well as unique designs that emulate traditional wire-line telephones for added user convenience. A complete portable telephone system is taught that allows users to take their telephone system, and telephone number, with them while they travel away from home or office.

Figure 1:
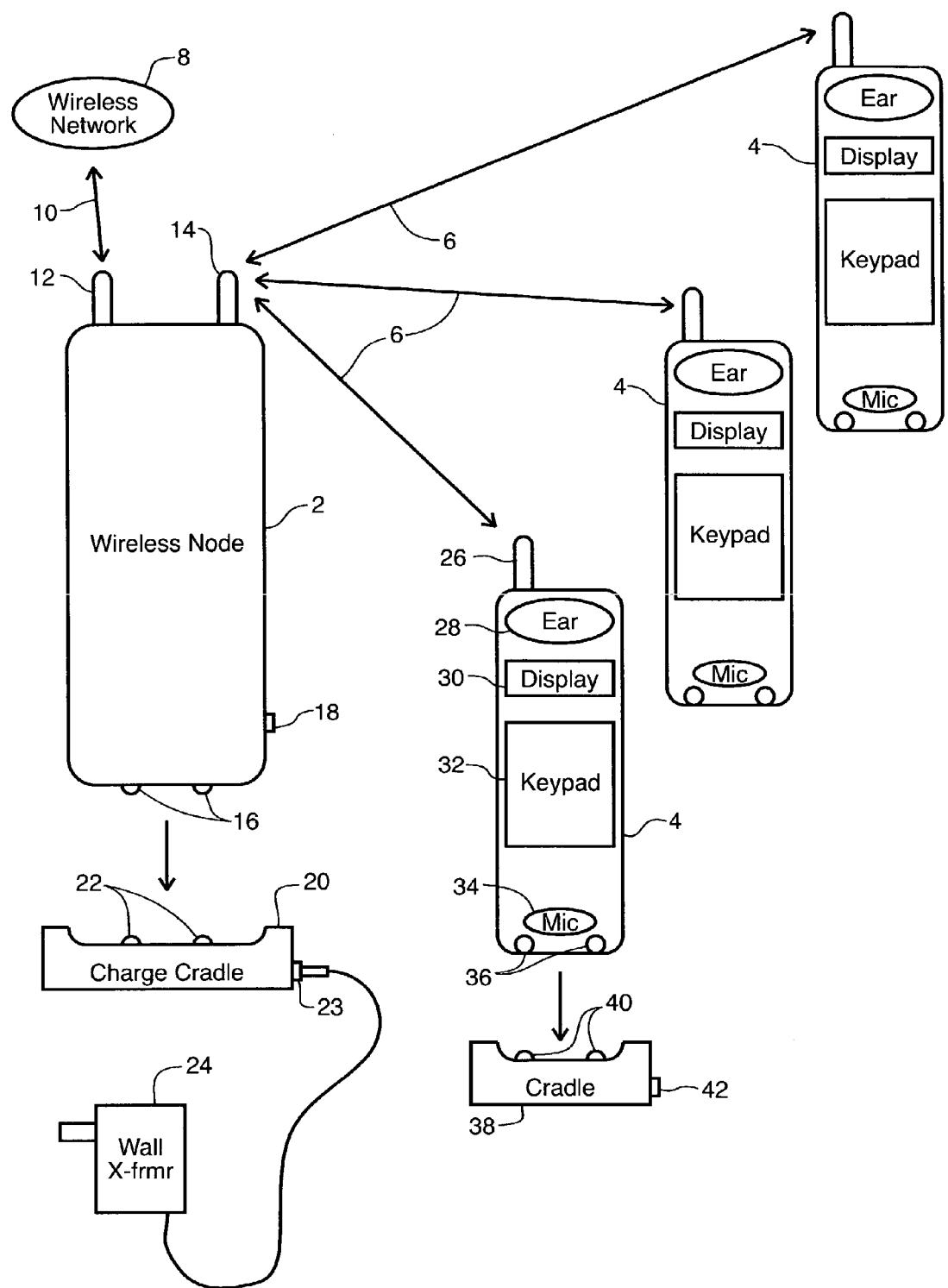
FIG. 1 is a diagram of three-handset wireless node system according to an illustrative embodiment of the present invention.

Reference is directed to FIG. 1, which is a diagram of a three-handset wireless node system according to an illustrative embodiment of the present invention. A wireless node 2 incorporates hardware and circuitry to enable communications with both a wireless network 8 and with multiple cordless terminal units 4. The wireless node 2 includes a wireless antenna 12 that communicates wireless signals 10 with a wireless network 8. The wireless network can be any of those presently deployed, which includes but is not limited to, AMPS networks, TDMA networks, CDMA networks, GSM Networks, the T-Mobile network, or other networks known to those skilled in the art. The network may also be one of those that may later be deployed or later becomes know to those skilled in the art. The essential aspect of the wireless network 8, with respect to the present invention, is that wireless audio signals and wireless control signals are transmitted within wireless signals. Further, that the wireless transceiver (discussed herein after) within the wireless node 2 is adapted to convert the audio and control portions of the wireless signals for use in subsequent processing.

In addition to wireless communications 10, the wireless node 2 also includes a cordless communications antenna 14 for communicating cordless signals 6 with multiple cordless handsets 4. The radio frequency bands and protocol used in the cordless radio signals 6 may be any of those known to those skilled in the art, or that later become known to those skilled in the art. These include, but are not limited to the 900 MHz cordless band, the 1.8 GHz cordless band, the 2.4 GHz cordless band, and the 5.8 GHz band. The particular signaling protocol may operate in accordance with, but is not limited to, an analog standard, a digital standard, the PHS standard, the DECT standard, and the various DSS protocol standards. What is essential with respect to the present invention is that the cordless transceiver (discussed herein after) within the wireless node 2 is operable to convert plural cordless audio signals and cordless control signals from the cordless signals 6. And, that the cordless signals are transmitted between the plural cordless terminal units 4 and the wireless node 2.

The wireless node 2 includes a power connector 18, which allows connection of external power, such as from a wall plug mounted AC transformer. In an illustrative embodiment, the wireless node 2 includes a self-powered battery (not shown) that is charged through battery charging contacts 16 disposed on the exterior of the wireless node case 2. A charging cradle 20 is provided that has corresponding charge terminals 22 aligned to engage the wireless node 2 battery charging contacts 16 while the wireless node 2 is engaged in the charging cradle 20. The charging cradle 20 receives power through an input connector 23 that couples to a wall-mount AC transformer 24, as are known to those skilled in the art.

The wireless node 2 communicates cordless signals 6 with plural cordless terminal units 4. The multiple cordless terminal units 4 are able to access the wireless network 8 and are able to access one another in an intercom operation. Thus, any one of the plural cordless terminal units can receive a telephone call from, or place a telephone call to, the wireless network 8. In an illustrative embodiment, multiple wireless telephone numbers can be assigned to the wireless node 2 by the wireless network 8, and the wireless node 2 is able to route each unique wireless telephone number to a particular one of the plural cordless terminal units 4. This is possible because each of the cordless terminal units 4 is assigned a unique identity within the cordless telephone protocol. Since each cordless terminal unit 4 has a unique identity, any of the cordless terminal units 4 is able to place a call to any other cordless terminal unit by addressing the unique identity of the desired unit. Addressing of either a telephone number or the unique identity of another cordless terminal unit is accomplished with a telephone keypad 32 on the cordless terminal unit 4. A display 30 is provided to enable user interface display of the called number or identity, the calling number or identity, stored numbers, and various other user interface functions as are known to those skilled in the art. Each cordless terminal unit 4 also includes an earphone speaker 28 and a microphone 34 as part of the user interface. An antenna 26 communicates cordless signals 6 with the wireless node 2.

Each of the cordless terminal units 4 is battery powered in the illustrative embodiment of FIG. 1. To facilitate charging of the battery, each cordless terminal unit includes battery charging contacts 36 disposed on the exterior of the cordless terminal unit case 4. A charging cradle 38 is provided for each cordless terminal unit 4 which has corresponding charging terminals 40 that are aligned to engage the battery charging contacts 36 when the cordless terminal unit 4 is engaged in the charging cradle 38. Power to the charging cradle 38 is provided through a power input terminal 42, which may accept power from a wall-plug mounted AC transformer (not shown) as are known to those skilled in the art.

Figure 2:
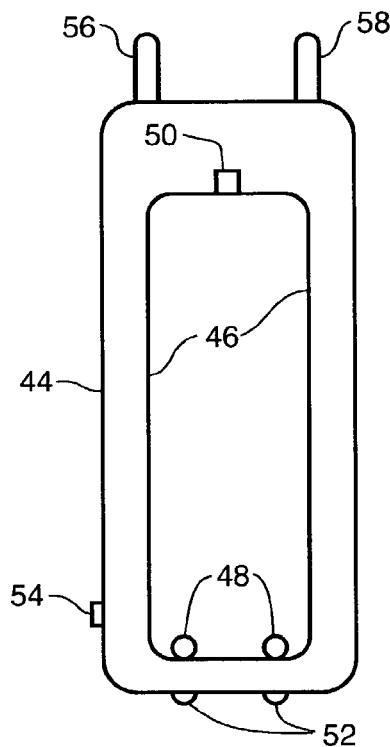
FIG. 2 is a back view of a wireless node according to an illustrative embodiment of the present invention.
Figure 3:
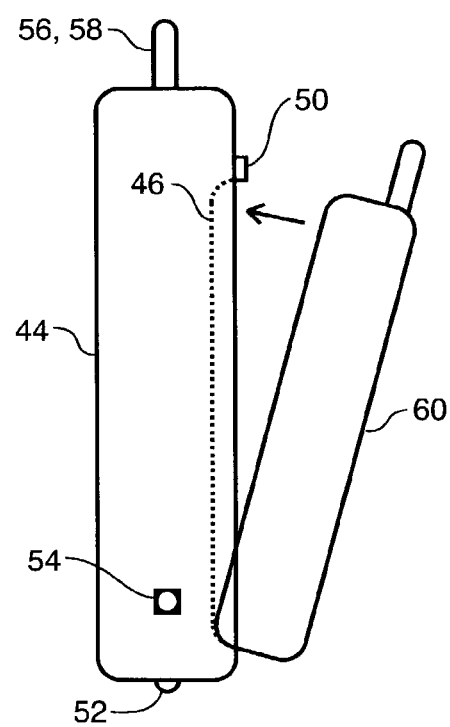
FIG. 3 is a side view of a wireless node according to an illustrative embodiment of the present invention.
Figure 4:
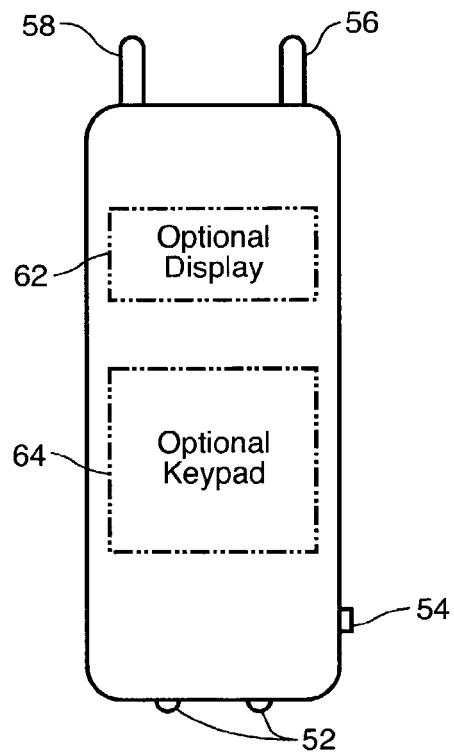
FIG. 4 is a front view of a wireless node according to an illustrative embodiment of the present invention.

Reference is directed to FIGS. 2, 3, and 4, which are a back view, a side view, and a front view, respectively, of a wireless node 44 according to an illustrative embodiment of the present invention. A notable feature of the present invention is the portability of certain illustrative embodiments. Portability is enhanced by battery power, yet it is desirable to maintain the size and weight of the cordless terminal units quite low. This dictates that a relatively small and low power battery be employed in the cordless terminal unit. It is less objectionable to use a larger, heavier, and more powerful battery in the wireless node. An advancement in the art is illustrated with a wireless node 44 that employs a charging cradle 46 adapted to engage and charge a cordless terminal unit 60. The wireless node 44 includes a wireless antenna 56 for communicating wireless signals with a wireless network, and a cordless antenna 58 for communicating cordless signals with a cordless handset 60. The charging cradle 46 is formed on a broad surface of the node 44 and includes charging terminals 48 and a retentive latch 50 for locking the cordless terminal in place when engaged with the charging cradles 46. The more powerful battery (not shown) within the wireless node 44 provides charging power to the battery (not shown) in the cordless terminal 60 while the two are engaged. The wireless node can also be powered or recharged by an external source. Either a wall plug mounted transformer can provide power through the power connector 54 on the wireless node 44, or the wireless node can be placed in a charging cradle (not shown) with power connected through charging contacts 52. Thus it is appreciated that the wireless node can operate from its own battery reserve or from outside power sources, and that the wireless node can provide a point of support and a supply of power to the cordless terminal unit. The wireless node may also include an optional display 62 and keypad 64, as are known to those skilled in the art, for providing a user interface for system programming and operation by the user or a service technician.

Figure 5:
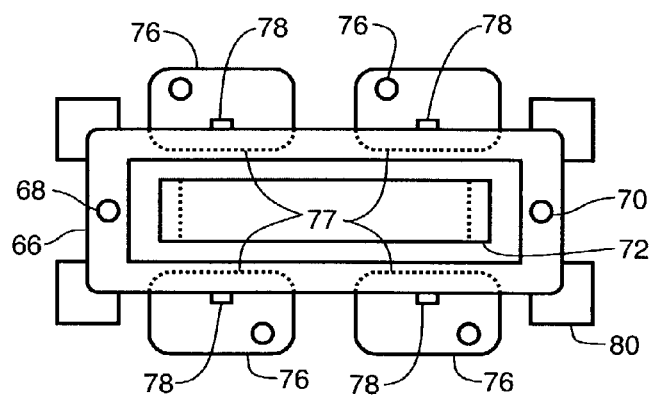
FIG. 5 is a top view of a four-handset wireless node according to an illustrative embodiment of the present invention.
Figure 6:
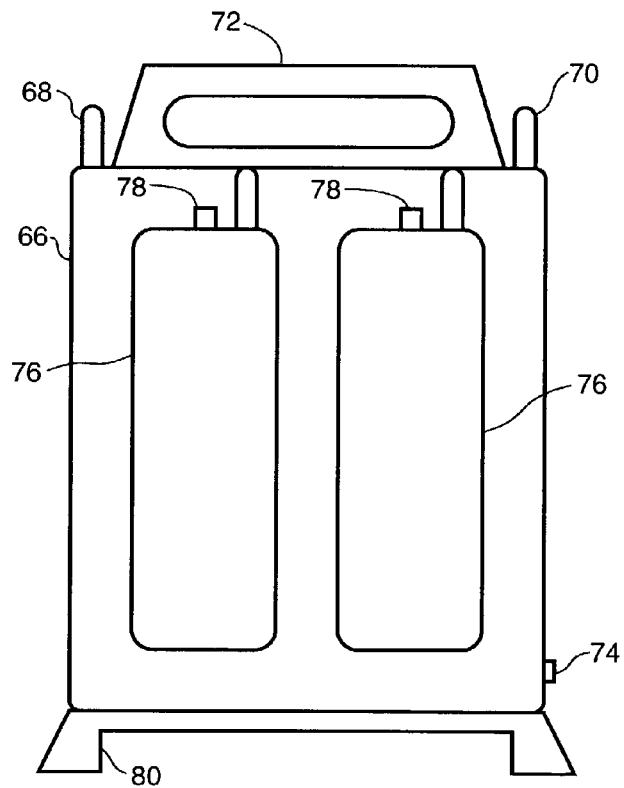
FIG. 6 is a side view of a four-handset wireless node according to an illustrative embodiment of the present invention.
Figure 7:
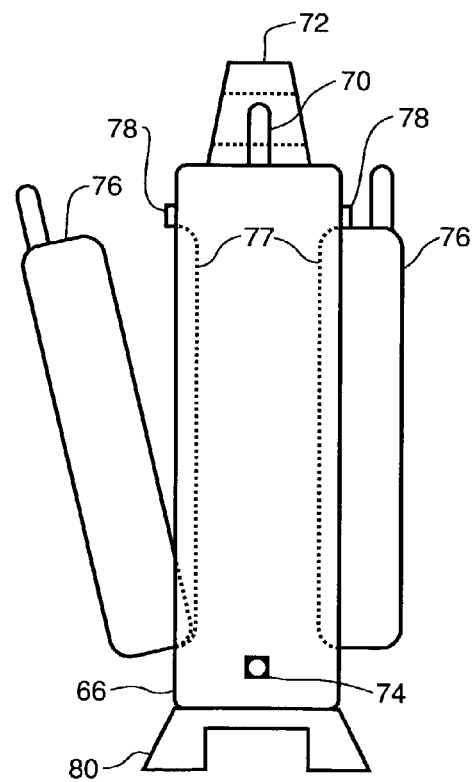
FIG. 7 is an end view of a four-handset wireless node according to an illustrative embodiment of the present invention.

Reference is direct to FIGS. 5, 6, and 7, which are a top view, a side view, and an end view, respectively, of a four-handset wireless node 66 according to an illustrative embodiment of the present invention. The wireless node 66 includes a wireless antenna 68 for communicating wireless signals with a wireless network, and a cordless antenna 70 for communicating cordless signals with plural cordless handsets 76. A handle 72 is formed on the top of the wireless node enclosure 66 as a portability convenience. A base 80 is formed on the bottom of the wireless node enclosure 66 to aid in stability. The wireless node 66 receives external power through a power connector 74, which may be coupled to a wall plug mounted AC transformer. The power is used to charge a high capacity storage battery (not shown) inside of the wireless node 66. The battery powers the wireless node circuitry and also provides power to four charging cradles 77 that engage the four cordless terminal units 76. Each charging cradle 77 includes a retentive latch 78 for locking the cordless terminals 76 in their respective cradles 77. When the cordless terminal units 76 are locked in place, the system provides a convenient package for transporting a multiple extension telephone system from place to place.

Figure 8:
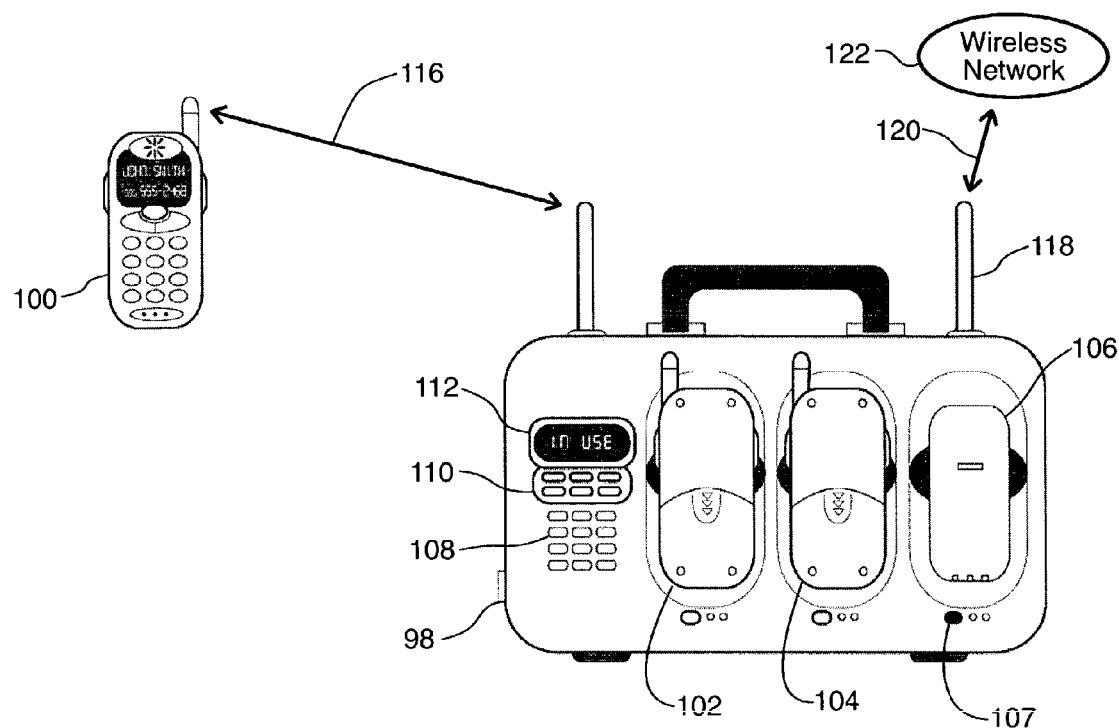
FIG. 8 is a diagram of a three-handset wireless node system according to an illustrative embodiment of the present invention.
Figure 9:
FIG. 9 is an application drawing of a three-handset wireless node system according to an illustrative embodiment of the present invention.

Reference is directed to FIG. 8, which is a diagram of a three-handset wireless node system 98 according to an illustrative embodiment of the present invention. A wireless antenna 118 communicates wireless signals 120 with a wireless network 122. A cordless antenna 115 communicates cordless signals 116 with any of the cordless terminal units 100. Three charging cradles 102, 104, and 106 are formed on the surface of the wireless node 98. An indicator 107 associated with charging cradle 106 activates when the cordless terminal unit 100 is active, and similar indicators are associated with the other two charging cradles 102, 104. A display 112 indicates the status of the system, such as indicating and "In Use" status. A telephone keypad 108 is provided for enabling telephone and unique identity dialing from the wireless node 98. A function keypad 108 is provided to enable various functions unique to the wireless node 98. FIG. 9 illustrates an application of the wireless node 98 and cordless terminal unit 100 in a camping environment.

FIGS. 10, 11, and 12 illustrate a top view, a side view and a front view, respectively, of a wireless node according to an illustrative embodiment of the present invention. This embodiment illustrates an application where the wireless node 82 is mounted in a fixed position, such as in a home or office. One benefit of a fixed position wireless node is that it can replace a wire-line service with wireless service, thereby obviating the need for dual telephone numbers. Also, the position of the wireless node and be selected to be out of sight, or for optimum wireless performance. The wireless node 82 includes the wireless antenna 84 and the cordless antenna 86 as described herein before. A handle 88 is provided for ease of installation and convenience is the node 82 is ever moved. A pair of key-slots 94 are formed in the exterior of the node enclosure 82 and are used to attached the node 82 with screws 96 to a vertical surface, such as a closet wall, etc. Those skilled in the art will appreciate that any number of wall mounting structures known to those skilled in the art could be applied to the wireless node 82. A power terminal 92 is provided for coupling external power, such as from a wall plug mounted AC transformer. In the fixed installation embodiment, and external wireless antenna connector 90 is provided. This allows the user to attach an antenna that may be remote mounted for better radio reception and transmission performance.

Figure 13:
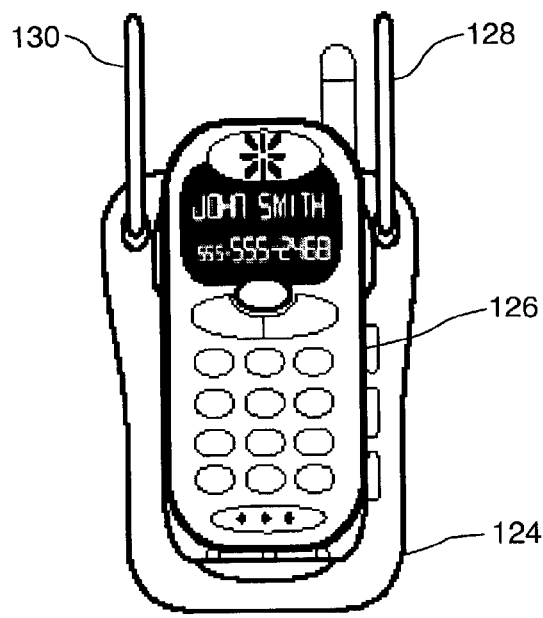
FIG. 13 is a drawing of a wall-mount wireless node and handset according to an illustrative embodiment of the present invention.

FIG. 13 is a drawing of a wall-mount wireless node and handset according to an illustrative embodiment of the present invention. An advantage of the present invention is the great variety of terminal unit configurations that are possible. This is beneficial because different users operating in different environments can have a telephone suited to their needs, yet still employ the advancements of the wireless node of the present invention. In FIG. 13, the wireless node 124 is configured as a wall mount cradle that may include some user interface functions. These functions can include a secondary dialing keypad, an "in use" indicator, dedicated functions keys, and other user interface features known to those skilled in the art. A wireless signal antenna 130 and a cordless signal antenna 128 are provided. The cordless terminal unit rests on a cradle of the wireless node 124. This enables charging of the cordless terminal unit 126 and ready access to the display on the cordless terminal unit, including a caller ID display. It should be noted that since the wireless node 124 supports multiple cordless terminal units in a multiple handset environment, other kinds of cordless terminal units can be used in the vicinity of the wireless node 124.

Figure 14:
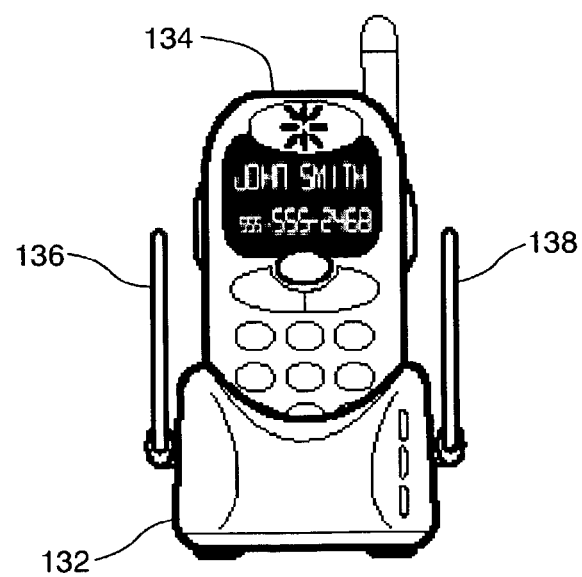
FIG. 14 is a drawing of a tabletop wireless node and handset according to an illustrative embodiment of the present invention.

FIG. 14 is a drawing of a tabletop wireless node and handset according to an illustrative embodiment of the present invention. This embodiment is very similar to the previously discussed embodiment, except that FIG. 14 is configured for tabletop operation. The wireless node 132 rests on a horizontal surface and presents a charging cradle to receive the cordless terminal unit 134 and to charge its battery as well. The wireless signal antenna 136 and cordless signal antenna 138 are also present. The same user interface options are also possible with this embodiment.

Figure 15:
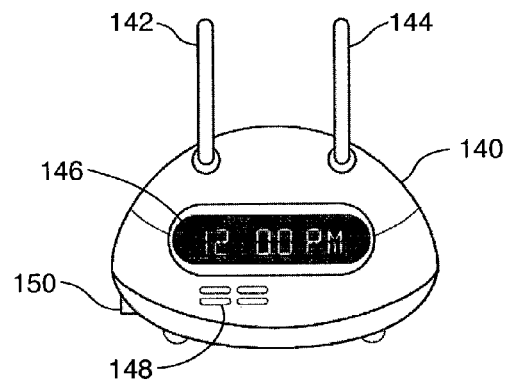
FIG. 15 is a drawing of a desk-clock wireless node according to an illustrative embodiment of the present invention.

The physical structure of the wireless node of the present invention is used advantageously in a multiple terminal unit cordless telephone system. As has been noted above, the wireless node can serve as a docking station for one or more terminal units. It can provide the space and circuitry to accommodate a high capacity storage battery. It can be configured for wall or table mounting, or adapted for portability. FIG. 15 is a drawing of another advantageous application of the present invention. In FIG. 15, a desk-clock wireless node according to an illustrative embodiment of the present invention is shown. The wireless node 140 includes the familiar wireless signal antenna 142 and cordless signal antenna 144. A power connector 150 is present for connection of external power, or an internal battery may be provided. A clock display 146 is added along with typical clock control function buttons 148. This design makes the wireless node useful as a tabletop, or wall mounted appliance. Designer schemes can be applied to match various decors.

Figure 16:
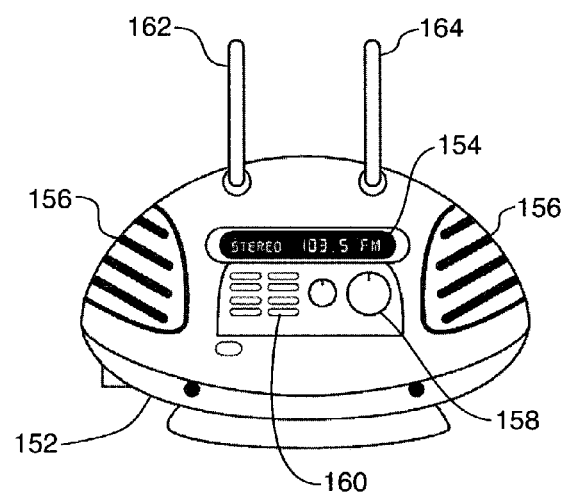
FIG. 16 is a drawing of an AF-FM radio wireless node according to an illustrative embodiment of the present invention.

In a similar vein to the wireless node clock, FIG. 16 illustrates an AF-FM radio wireless node according to an illustrative embodiment of the present invention. The wireless node 152 includes the wireless signal antenna 162 and the cordless signal antenna 164. A pair of stereo speakers 156 is housed in the wireless node 152 together with a radio receiver (not shown). The radio user interface is present including a tuning display 154, volume and channel selection knobs 158 and some dedicated function buttons 160 as are typical for that type of radio receiver. An additional antenna is required for the radio receiver, which can be internal to the wireless node 152, connected to an external antenna connector, or can be shared with the cordless or wireless antennas. Those skilled in the art will appreciate that any desirable radio or television band receiver could be included in the wireless node 152. For example, a NOAA weather radio or TV audio receiver could be included.

One application of the present invention is that a wireless telephone transceiver is used as a replacement for a wire-line telephone resource in a telephone system. Traditionally, users have had limited expectations about what a wireless telephone is like. These basically include stand-alone handsets and vehicular mounted systems, often times with complex or cumbersome user interfaces. By applying the wireless node concept of the present invention, the cordless radio link separates the wireless part of the system from the terminal unit part of the system. Thus, the terminal unit can be produced in a variety of configurations. Some examples include a cordless headset or handset. Other examples or cordless products that emulate convention corded telephones used in direct PSTN connection systems. While this concept may seem counter-intuitive to what users expect in wireless and cordless products, in is rather sensible when one considers that the wireless node of the present invention is meant, in some applications, to replace wire-line service. Thus, users with expectations consistent with wire-line technology can have a terminal unit meeting their expectations. Users with expectations consistent with current wireless or cordless technology can also have their expectations met.

Figure 17:
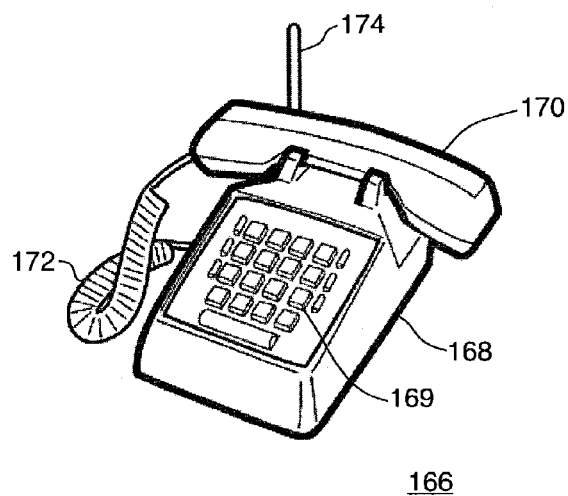
FIG. 17 is a drawing of a "2500 set" style cordless telephone according to an illustrative embodiment of the present invention.

Reference is directed to FIG. 17, which is a drawing of a "2500 set" 166 style cordless telephone according to an illustrative embodiment of the present invention. The "2500 set" nomenclature is derived from the pre-divestiture Bell Operating Systems classic desk telephone that was called the "2500 set." Such a device is known to those skilled in the art. A "2500 set" enclosure 168 houses the cordless telephone circuitry, which is evidenced by the presence of a cordless signal antenna 174 extending from the housing 168. A conventional speaker-microphone handset 170 is coupled to the housing 168 by a conventional coiled cord 172. A telephone DTMF keypad 169 is present, and may include additional functions keys dedicated to the cordless specific features of the telephone. The "2500 set" embodiment is a comfortable design for users who prefer a traditional telephone, including the corded handset. Since the housing 168 is relatively large, a substantial battery can be installed, enable very extended periods of time before replacement or recharging are needed. This telephone terminal unit can be left at one place in a home or office, or the user can carry the entire set from room to room at will. In another embodiment of this same approach, the classic Bell Operating Systems "Princess Set" can be emulated. The case style is suitably changed, with the user interface dialing keypad placed in the handset, as was done with the original "Princess Set."

Figure 18:
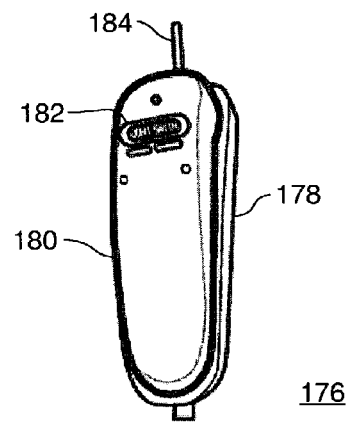
FIG. 18 is a drawing of a wall-mount style cordless telephone according to an illustrative embodiment of the present invention.

FIG. 18 illustrates a wall-mount style cordless telephone 176 according to an illustrative embodiment of the present invention. This design is consistent with expectations of cordless telephone users. The wall mount cradle 178 is fixed to a vertical surface. The handset 180 rests in the cradle 178 and its battery (not shown) is charged. A cordless signal antenna 184 extends from the handset 180. Note that the cordless signal antenna does not couple with an antenna on the base 178, but rather with a wireless node as described hereinbefore. A display is visible on the exposed side of the handset 180 so that users can check status or incoming calling party identification if available. The dialing keypad an other user interface controls are mounted on the handset. Note that there is no cord between the base and the handset.

Figure 19:
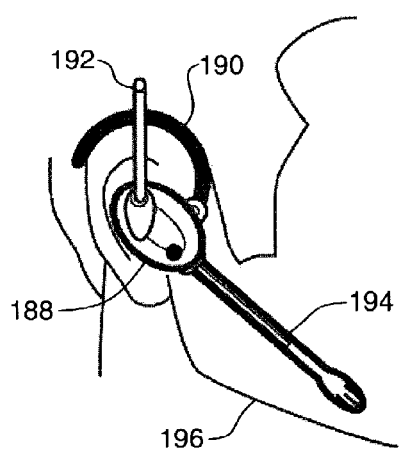
FIG. 19 is a drawing of a headset style cordless telephone according to an illustrative embodiment of the present invention.
Figure 20:
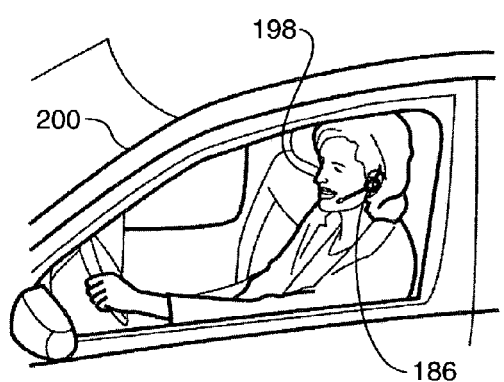
FIG. 20 is an application drawing of a headset style cordless telephone according to an illustrative embodiment of the present invention.

FIG. 19 illustrates a headset style cordless telephone 186 according to an illustrative embodiment of the present invention. A housing 188 contains the transceiver and associated circuitry, as well as a small battery. An ear support structure 190 is attached to the housing 188 and extends over the user's 196 ear to support the headset 186. A microphone support structure 194, in the form of a boom in the illustrative embodiment, supports and extends the microphone into receptive proximity to the user's 196 mouth. Other ear support structures and microphone support structures are known to those skilled in the art and may be applied to the illustrative embodiment. FIG. 20 illustrates a typical application of the headset 186 by a user 198 in a vehicle 200 in a hands-free mode of operation. Note that the wireless node would be located elsewhere in the vehicle.

The foregoing descriptions of the illustrative embodiments of the present invention articulated the exterior design, structure, and features generally. What follows is a series of discussion, with corresponding drawing figures, of the internal functional design of the wireless nodes and cordless terminal units in the illustrative embodiments.

Figure 21:
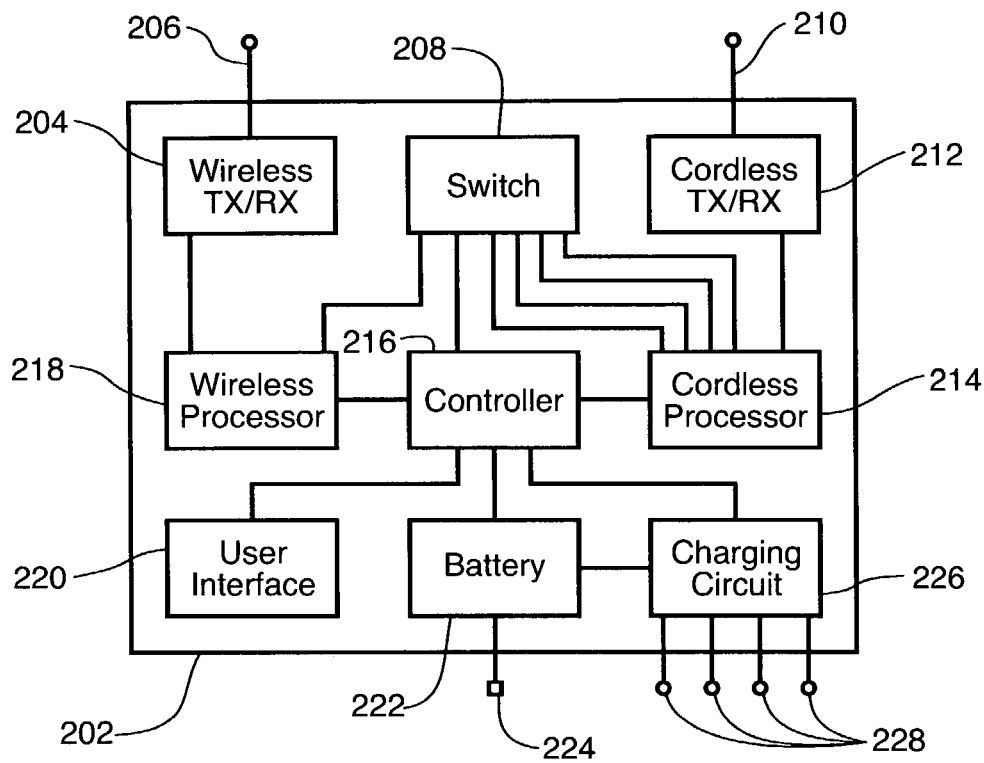
FIG. 21 is a functional block diagram of a wireless node according to an illustrative embodiment of the present invention.

Reference is directed to FIG. 21, which is a functional block diagram of a wireless node 202 according to an illustrative embodiment of the present invention. A wireless antenna 206 couples signals to and from a wireless transceiver 204. The transceiver modulates and demodulates the encoded wireless signals to the base-band. A wireless processor 218 converts the base-band signals to a wireless audio signal portion and a wireless control signal portion. The signals are duplex signals. These portions may be analog or digital depending on the radio technology employed, which may be any of those known to people skilled in the art. The wireless control signals are coupled to a controller 216. On the cordless side of the wireless node 202, a cordless signal antenna 210 couples cordless radio signals to a cordless transceiver 211. The cordless transceiver 212 modulates and demodulates the encoded cordless signals to the base-band. A cordless processor converts the cordless signals to plural cordless audio signals and cordless control signals. The signals are duplex signals. The cordless control signals are coupled to the controller 216. The controller operates and provides functionality by execution of suitable source code that is programmed into a memory portion of the controller 216. Control signals to and from both the wireless processor 218 and the cordless processor 214 enable the call progress functions of the wireless node 202. Those skilled in the art will appreciate that any of a variety of processors, microprocessors, controllers, microcontrollers, ASICs (application specific integrated circuits), signal processors, or other programmable devices may be used to embody the wireless processor 218, controller 216 and cordless processor 214. In fact a single such device may embody all three, or discrete devices may be used for each, and so forth.

The wireless audio signals and the plural cordless audio signals are coupled to switch 208, which serves to cross connect any two of these signals upon command of the controller 216. The technology utilized in the switch 208 will depend on the nature of the audio signals, which are controlled by the protocol and technology of the transceivers. Analog signals lend themselves to circuit switching, while data signals lend themselves to multiplexed switching. A telecommunications cross-point switching device may be used, or a digital switching device. In fact, the controller 216 can be used as the switch 208 in certain applications. Those skilled in the art are familiar with various technologies suitable for implementing the switch 208. In operation, as calls are processed, the controller 216 directs the switch 208 to couple calls from the wireless side to the cordless side or from different audio signals on the cordless side depending on the nature of the call.

A user interface 220 is provided in the illustrative embodiment, and includes actuators for user access, indicators and a display. The implementation of such a user interface is known to those skilled in the art. A storage battery 250 is coupled to provide power to the various circuits in the illustrative embodiment wireless node 202. A battery charging terminal 224 is present to allow connection of an external power supply for charging the battery 222 or for directly powering the wireless node 202 and its various circuits. A charging circuit 226 is provided and includes plural battery charging contacts 228. The charging contacts 228 are disposed upon the charging cradles on the exterior of the wireless node 202 in the illustrative embodiment. Current from the battery 222 or from and external power source through charging terminal 224 can be used to power the charging circuit 228. The charging circuit connects and regulates current flow to charge the terminal unit batteries when terminal units are engaged in the wireless node 202 charging cradles.

Figure 22:
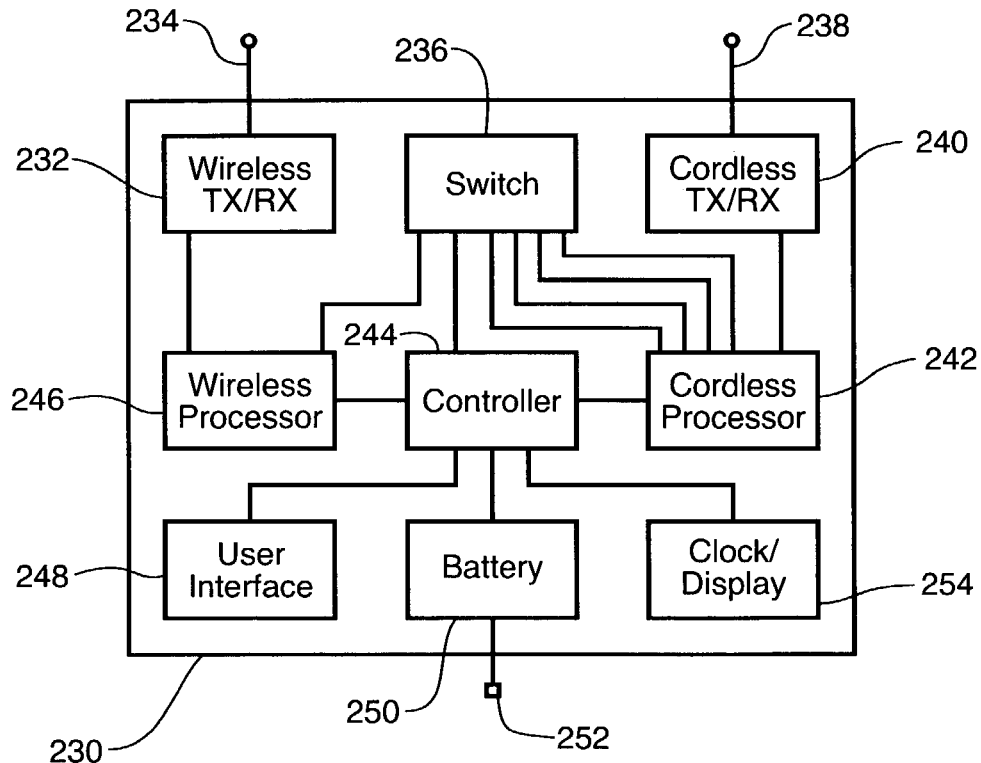
FIG. 22 is a functional block diagram of a wireless node with clock according to an illustrative embodiment of the present invention.

Reference is directed to FIG. 22, which is a functional block diagram of a wireless node 230 with a clock feature according to an illustrative embodiment of the present invention. The basic structure of the wireless node 230 is very similar to that in FIG. 21. Most of the functional sections are identical. In FIG. 22, a wireless antenna 234 is coupled to a wireless transceiver 232, which couples wireless signals to a wireless processor 246. The processor is further coupled to a controller 244 and to a switch 236. On the cordless side, a cordless antenna 238 is coupled to a cordless transceiver 242, which is further coupled to the controller 244 and the switch 236. A user interface 248 is presented and coupled to the controller 244. A storage battery 250 powers the various circuits in the wireless node 230. The storage battery 250 is charged though charging terminal 252, or the external power supplied to the charging terminal may be used to power the wireless node 230 directly, thereby obviating the need for battery 250. The details of operation of the foregoing functional elements are the same as described with respect to the illustrative embodiment in FIG. 21. In FIG. 22, a clock and clock display 254 is added to the wireless node 230.

Figure 23:
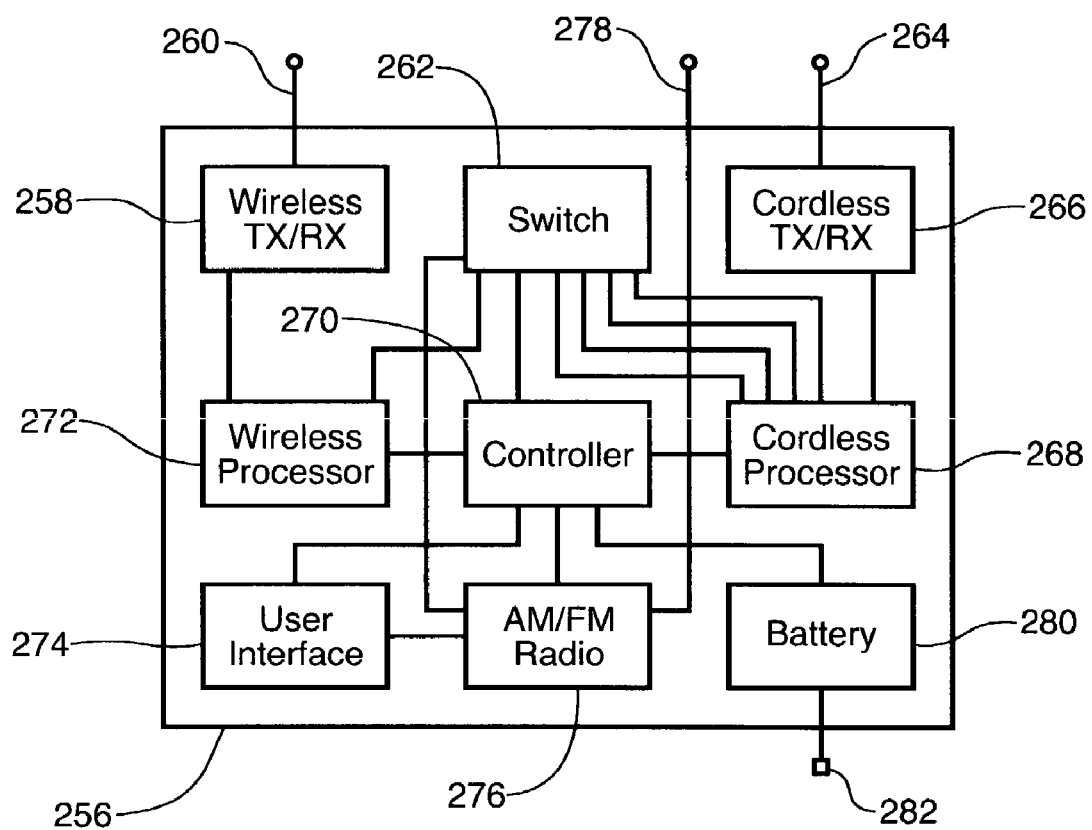
FIG. 23 is a functional block diagram of a wireless node with AM/FM radio according to an illustrative embodiment of the present invention.

Reference is directed to FIG. 23, which is a functional block diagram of a wireless node 256 with an AM/FM radio feature according to an illustrative embodiment of the present invention. The basic structure of the wireless node 256 is very similar to that in FIG. 21. Most of the functional sections are identical. In FIG. 23, a wireless antenna 260 is coupled to a wireless transceiver 258, which couples wireless signals to a wireless processor 272. The processor is further coupled to a controller 270 and to a switch 262. On the cordless side, a cordless antenna 264 is coupled to a cordless transceiver 268, which is further coupled to the controller 270 and the switch 262. A user interface 274 is presented and coupled to the controller 270. A storage battery 280 powers the various circuits in the wireless node 256. The storage battery 280 is charged though charging terminal 282, or the external power supplied to the charging terminal may be used to power the wireless node 256 directly, thereby obviating the need for battery 280. The details of operation of the foregoing functional elements are the same as described with respect to the illustrative embodiment in FIG. 21. In FIG. 23, an AM/FM radio tuner with corresponding antenna 278 is added to the wireless node 256. The antenna 278 may be internal to the wireless node 256, added as an external antenna by using an antenna connector, or may be shared with the wireless antenna 260 or the cordless antenna 264. The radio's user interface is incorporated into the wireless node 256 user interface 274. The elements of this user interface 274 include a tuning indicatory, tuning and volume controls, as well as other dedicated radio function controls as are known to those skilled in the art.

Figure 24:
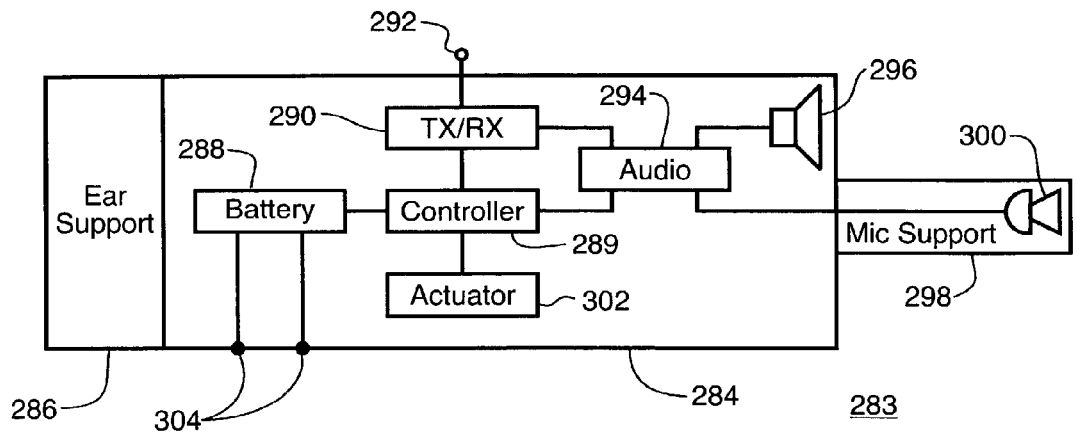
FIG. 24 is a functional block diagram of a headset style cordless telephone according an illustrative embodiment of the present invention.

Reference is directed to FIG. 24, which is a functional block diagram of a headset style cordless telephone 283 according an illustrative embodiment of the present invention. Housing 284 supports the various circuit components of the wireless headset 283. An antenna 292 couples cordless signals to and from a wireless node (not shown). The antenna 292 is coupled to a cordless transceiver 290 that modulates and demodulates cordless audio and cordless control signals. The cordless control signals are coupled to controller 289. The cordless audio signals are coupled to an audio circuit 294, which is adapted to couple directly to a speaker 296 and a microphone 300. A storage battery 288 provides power to all the circuitry in the headset 283. Battery charging terminals 304 are coupled to charge battery 288 while the headset 283 is engaged in a charging cradle (not shown). Control actuator(s) 302 are provided for activating the hook-switch function of the headset 283 and for limited control such as volume, power, and others known to those skilled in the art. An ear support structure 286 us coupled to housing 284, and a microphone support structure 298 is coupled to the housing 284 to support the microphone 300 in receptive proximity to the user's mouth.

Figure 25:
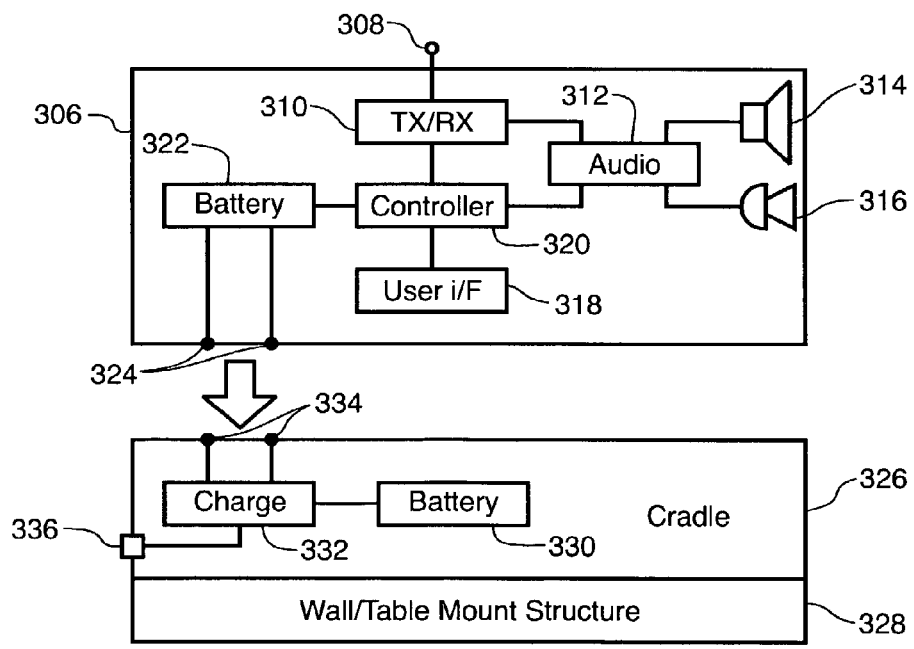
FIG. 25 is a functional block diagram of a wall-mount or desktop style cordless telephone according an illustrative embodiment of the present invention.

Reference is directed to FIG. 25, which is a functional block diagram of a wall-mount or desktop style cordless telephone according an illustrative embodiment of the present invention. The cordless telephone is comprised of two components, the handset 306 and the charging cradle 326. The handset includes a cordless antenna 308 that couples cordless signals to and from a wireless node (not shown). The antenna 308 is coupled to a cordless transceiver 310 that modulates and demodulates cordless audio and cordless control signals. The cordless control signals are coupled to controller 320. The cordless audio signals are coupled to an audio circuit 312, which is adapted to couple directly to a speaker 314 and a microphone 316. A storage battery 322 provides power to all the circuitry in the handset 306. Battery charging terminals 324 are coupled to charge battery 322 while the handset 306 is engaged in a charging cradle 326. A user interface 318 is provided for dialing, activating the hook-switch function, and for other dedicated functions as are known to those skilled in the art. The charging cradle 326 includes a storage battery 330 that is coupled to a charging circuit 332. The charging circuit 332 receives power from external power source connector 336. The charging circuit provides power to battery charging contacts 334, which are aligned to engage charging terminals 324 of the handset. 306 while it is engaged with the charging cradle 326. The source of power to the charging circuit 332 can be from the external source 336 or the internal storage battery 330. A wall or table mount structure 328 is provided for adapting the mounting options of the cradle 326.

Figure 26:
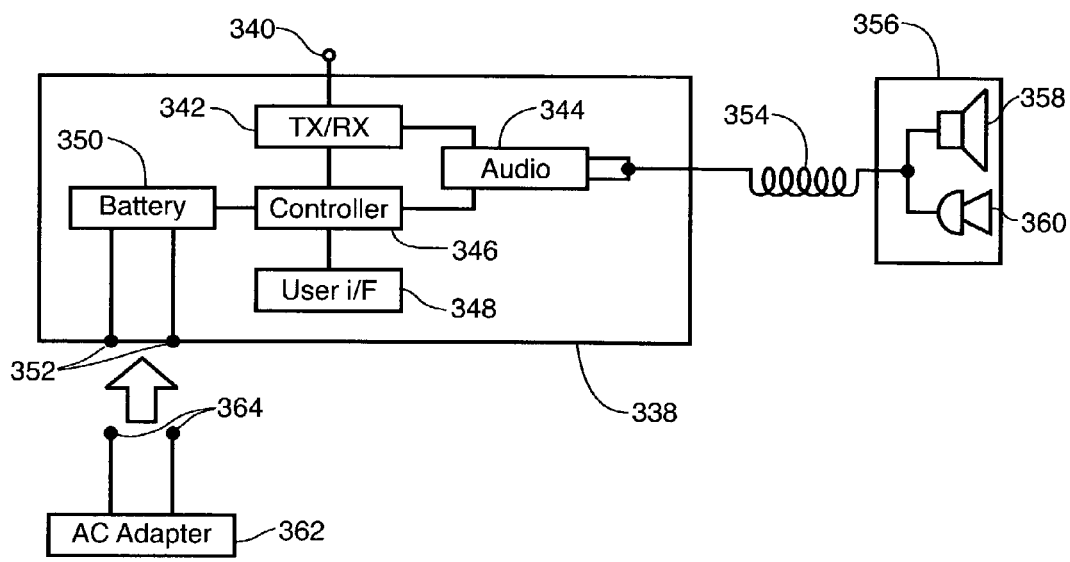
FIG. 26 is a functional block diagram of a "2500 set" style cordless telephone according an illustrative embodiment of the present invention.

Reference is directed to FIG. 26, which is a functional block diagram of a "2500 set" style cordless telephone according an illustrative embodiment of the present invention. The cordless telephone is comprised of two components, the base 338 and the handset 356. The base 338 includes a cordless antenna 340 that couples cordless signals to and from a wireless node (not shown). The antenna 340 is coupled to a cordless transceiver 342 that modulates and demodulates cordless audio and cordless control signals. The cordless control signals are coupled to controller 346. The cordless audio signals are coupled to an audio circuit 344, which is adapted to couple a speaker 358 and a microphone 360 through a coiled cord 354. The speaker 358 and microphone 360 are located in the handset housing 356. A storage battery 350 provides power to all the circuitry in the telephone. An external power connector 352 is coupled to charge battery 350. A user interface 348 is provided for dialing, activating the hook-switch function, and for other dedicated functions as are known to those skilled in the art. An AC power adapter 362 is provided, which is coupled to external power connector 352 with plug 364 to charge battery 350, or to power the telephone directly.

Figure 27:
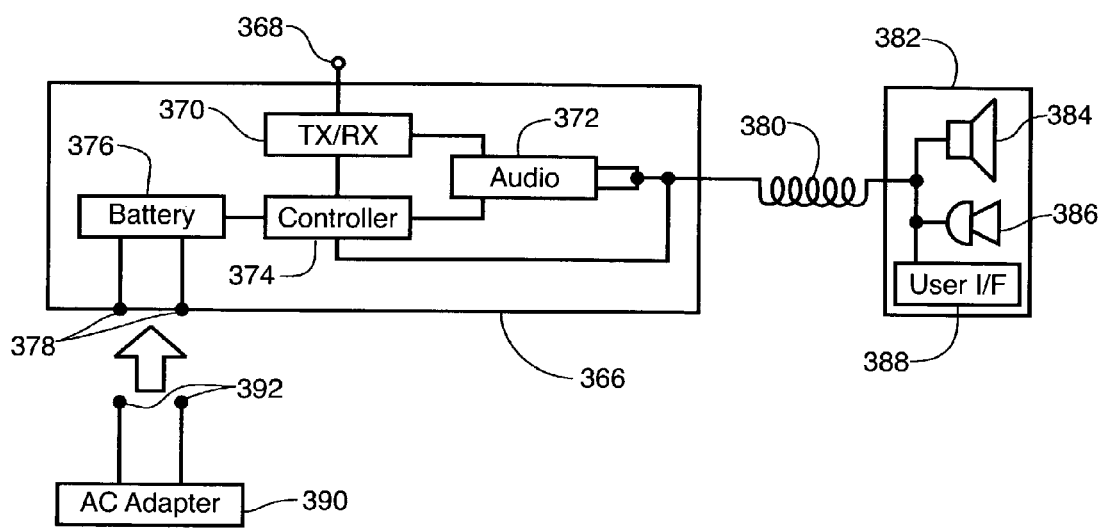
FIG. 27 is a functional block diagram of a "princess" style cordless telephone according an illustrative embodiment of the present invention.

Reference is directed to FIG. 27, which is a functional block diagram of a "Princess set" style cordless telephone according an illustrative embodiment of the present invention. The cordless telephone is comprised of two components, the base 366 and the handset 388. The base 366 includes a cordless antenna 368 that couples cordless signals to and from a wireless node (not shown). The antenna 368 is coupled to a cordless transceiver 370 that modulates and demodulates cordless audio and cordless control signals. The cordless control signals are coupled to controller 374. The cordless audio signals are coupled to an audio circuit 372, which is adapted to couple a speaker 384 and a microphone 386 through a coiled cord 380. The speaker 384 and microphone 386 are located in the handset housing 382. A storage battery 376 provides power to all the circuitry in the telephone. An external power connector 378 is coupled to charge battery 376. A user interface 388 is provided for dialing, activating the hook-switch function, and for other dedicated functions as are known to those skilled in the art. The user interface 388 is located in the handset 382 and is coupled to controller 374 through coiled cord 380. An AC power adapter 390 is provided, which is coupled to external power connector 378 with plug 392 to charge battery 376, or to power the telephone directly.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A wireless telephone node system for interconnecting a wireless telephone network with plural cordless telephone terminal units operating in accordance with a multiple terminal cordless telephone system protocol, comprising:
a wireless transceiver adapted to communicate wireless signals with the wireless telephone network;
a first processor adapted to convert wireless audio signals and wireless control signals from said wireless signals;
a first cordless transceiver adapted to communicate cordless signals with the plural cordless telephone terminal units according to the multiple terminal cordless telephone system protocol;
a second processor adapted to convert plural cordless audio signals, corresponding to the plural cordless telephone terminal units, and cordless control signals from said cordless telephone signals;
a switch coupled to connect said wireless audio signals and said plural cordless audio signals, and
a controller coupled to cause said switch to connect any two of said wireless audio signals and said plural cordless audio signals in response to said wireless control signals or said cordless control signals.

2. The system of claim 1 wherein said wireless transceiver operates in compliance with a promulgated wireless network signaling protocol.

3. The system of claim 2 wherein said protocol is selected form one of GSM, T-Mobile, CDMA, TDMA, or AMPS.

4. The system of claim 1 wherein said first cordless transceiver operates in one of the 900 MHz cordless band, the 1.8 GHz cordless band, the 2.4 GHz cordless band, or the 5.8 GHz band in accordance with an analog standard, the PHS, DECT, or DSS protocols.

5. The system of claims 1 further comprising a portable housing.

6. The system of claim 5 further comprising a charging circuit having a charging output.

7. The system of claim 6 wherein said housing has a charging cradle formed thereon for engaging a cordless terminal unit, and wherein said charging output is aligned to couple to corresponding charging contacts on the cordless terminal unit when engaged with said charging cradle.

8. The system of claim 7 wherein said charging circuit further comprising a battery coupled to power the node and coupled to said charging output.

9. The system of claim 1 further comprising a mounting structure adapted to support said housing from a vertical surface.

10. The system of claim 1 further comprising a clock and clock display.

11. The system of claim 1 further comprising a broadcast radio receiver having a radio audio output and a radio user interface.

12. The system of claim 11 wherein said radio audio output is coupled to said switch, and wherein said controller is operable to cause said switch to connect said radio audio to said wireless transceiver or said cordless transceiver.

13. The system of claim 1 further comprising at least a first cordless terminal unit, comprising:
a second cordless transceiver adapted to communicate cordless signals, including audio signals and control signals, with said first cordless transceiver;
an audio circuit operable to couple audio signals between said second cordless transceiver and a speaker and microphone;
a battery coupled to power the cordless terminal unit;
a user interface adapted to receive user inputs, wherein said user inputs are coupled to said second cordless transceiver as cordless control signals, and
an enclosure that supports said battery, said second cordless transceiver, and said audio circuit.

14. The system of claim 13 wherein said cordless terminal unit further comprises:
an ear support structure fixed to said enclosure for supporting the cordless terminal on a user's ear, and
a microphone support structure fixed to said enclosure for locating said microphone in receptive proximity to a user's mouth while said ear support structure is engaged with the user's ear.

15. The system of claim 13 wherein said enclosure further comprises battery charging contacts disposed on the exterior thereof, said charging contacts coupled to said battery for charging thereof, said cordless terminal further comprising:
a charging cradle adapted to receive said cordless terminal unit;
a charging circuit disposed within said charging cradle, and
charging terminals disposed on the exterior of said charging cradle and coupled to said charging circuit, said charging terminal aligned to engage said battery charging contacts when said cordless terminal unit is engaged with said charging cradle.

16. The system of claim 13 further comprising:
a handset having said microphone and said speaker disposed therein, and
a cord coupled from said microphone and said speaker to said audio circuit.

17. The system of claim 13 further comprising:
a handset having said microphone, said speaker, and said user interface disposed therein, and
a cord coupled from said microphone and said speaker to said audio circuit, and coupled from said user interface to said transceiver.

18. A wireless telephone node system for interconnecting a wireless telephone network with plural cordless telephone terminal units operating in accordance with a multiple terminal cordless telephone system protocol, comprising:
a wireless transceiver adapted to communicate wireless signals with the wireless telephone network;
a first processor means for converting wireless audio signals and wireless control signals from said wireless signals;
a first cordless transceiver adapted to communicate cordless signals with the plural cordless telephone terminal units according to the multiple terminal cordless telephone system protocol;
a second processor means for converting plural cordless audio signals, corresponding to the plural cordless telephone terminal units, and cordless control signals from said cordless telephone signals;
a switch means coupled to connect said wireless audio signals and said plural cordless audio signals, and
a controller means operable to cause said switch means to connect any two of said wireless audio signals and said plural cordless audio signals in response to said wireless control signals or said cordless control signals.

19. The system of claims 18 further comprising a portable housing.

20. The system of claim 19 further comprising a charging circuit having a charging output.

21. The system of claim 20 wherein said housing has a charging cradle formed thereon for engaging a cordless terminal unit, and wherein said charging output is aligned to couple to corresponding charging contacts on the cordless terminal unit when engaged with said charging cradle.

22. The system of claim 21 wherein said charging circuit further comprising a battery coupled to power the node and coupled to said charging output.

23. The system of claim 18 further comprising a mounting structure adapted to support said housing from a vertical surface.

24. The system of claim 18 further comprising a clock and clock display.

25. The system of claim 18 further comprising a broadcast radio receiver means having a radio audio output and a radio user interface.

26. The system of claim 25 wherein said radio audio output is coupled to said switch means, and wherein said controller means operates to cause said switch means to connect said radio audio to said wireless transceiver or said cordless transceiver.

* * * * *